United States Patent
Moradi et al.

(10) Patent No.: US 12,540,590 B2
(45) Date of Patent: Feb. 3, 2026

(54) IGNITION AND OPERATION OF LIQUID FUEL POWERED ROCKET ENGINE

(71) Applicant: VENUS AEROSPACE CORP, Houston, TX (US)

(72) Inventors: Ali Moradi, Houston, TX (US); William Thomas Ross, Houston, TX (US); Vishal Doshi, Houston, TX (US); Eric Wernimont, Houston, TX (US); Andrew Duggleby, Houston, TX (US)

(73) Assignee: VENUS AEROSPACE CORP, Houston, TX (US)

( * ) Notice: Subject to any disclaimer, the term of this patent is extended or adjusted under 35 U.S.C. 154(b) by 145 days.

(21) Appl. No.: 18/449,579

(22) Filed: Aug. 14, 2023

(65) Prior Publication Data
US 2025/0059934 A1 Feb. 20, 2025

(51) Int. Cl.
*F02K 9/95* (2006.01)
*F02K 9/42* (2006.01)

(52) U.S. Cl.
CPC ............... *F02K 9/95* (2013.01); *F02K 9/425* (2013.01)

(58) Field of Classification Search
CPC ... F02K 9/42; F02K 9/425; F02K 9/52; F02K 9/68; F02K 7/02; F02K 7/00
See application file for complete search history.

(56) References Cited

U.S. PATENT DOCUMENTS

| | | | | |
|---|---|---|---|---|
| 3,240,010 A * | 3/1966 | Morrison | ............. | F02K 9/66 60/213 |
| 10,364,151 B2 | 7/2019 | Wynn et al. | | |
| 11,480,136 B1 * | 10/2022 | Smith | ............. | F02K 9/52 |
| 11,619,172 B1 * | 4/2023 | Bower | ............. | F23R 7/00 60/776 |
| 2010/0251692 A1* | 10/2010 | Kinde, Sr. | ............. | F02K 7/16 60/767 |
| 2017/0146244 A1* | 5/2017 | Kurosaka | ............. | F23R 3/10 |
| 2022/0195963 A1* | 6/2022 | Liu | ............. | F02C 5/02 |
| 2023/0340931 A1* | 10/2023 | Burke | ............. | F02K 9/52 |
| 2023/0383711 A1* | 11/2023 | Duggleby | ............. | F02K 9/48 |
| 2024/0125287 A1* | 4/2024 | Smith | ............. | F02K 9/52 |

FOREIGN PATENT DOCUMENTS

| | | | | |
|---|---|---|---|---|
| CN | 203604065 | 5/2014 | ............. | F02K 9/64 |
| CN | 103993984 | 8/2014 | ............. | F02K 9/95 |
| CN | 112177801 | 1/2021 | ............. | F02K 9/68 |

OTHER PUBLICATIONS

Xia et al, "Effects of ignition condition on the initiation characteristics of rotating detonation wave in plane radial structure" (Year: 2020).*
Peng et al, "Ignition experiment with automotive spark on rotating detonation engine" (Year: 2015).*
(Continued)

*Primary Examiner* — Gerald L Sung
(74) *Attorney, Agent, or Firm* — HAYES SOLOWAY P.C.

(57) ABSTRACT

A rocket engine configured to run on a liquid fuel and liquid hydrogen peroxide is started by impinging high pressure streams of a fuel and liquid $H_2O_2$ into a combustion chamber under pressure and temperature conditions sufficient to decompose the liquid $H_2O_2$ into hot water stream and oxidizer and achieve ignition.

7 Claims, 6 Drawing Sheets

(56) References Cited

OTHER PUBLICATIONS

Wessel, "How Rocket Engiens Ignite", Headed for Space website, https://headedforspace.com/how-rocket-engines-ignite/, accessed May 10, 2023, 7 pgs.
"JP-8", https://en.wikipedia.org/w/index.php?title=JP-8&oldid=1143819913, accessed May 10, 3 pgs.

* cited by examiner

IGNITION AND OPERATION OF LIQUID FUEL POWERED ROCKET ENGINE

FIELD OF THE DISCLOSURE

The present disclosure relates to rocket engines, and more particularly to ignition and operation of rocket engines on liquid fuels and liquid oxidizers. The disclosure has particular utility in connection with the ignition and operation of rotating detonation rocket engines (RDREs) on liquid fuels and liquid oxidizers and will be described in connection with such utility, although other utilities are contemplated.

BACKGROUND AND SUMMARY

Rotating Detonation Rocket Engines (RDREs) are engines using a form of pressure gain combustion, based on a detonation wave traveling around an annular reaction chamber or reaction channel or annulus. In detonative combustion, the process achieves supersonic flow to provide propulsion. RDREs theoretically are more efficient than conventional deflagrative combustion rocket engines.

In operation, a fuel and an oxidizer are injected into the reaction channel, normally through small holes or slits, and detonation is initiated in the fuel/oxidizer mixture by an igniter. After the engine is started, detonation of the fuel/oxidizer mixture is self-sustaining. That is to say, once deflagration ignites the fuel/oxidizer mixture, the energy released sustains the detonations or detonation wavefront in subsequent order. The products of detonation combustion expand out of the reaction channel and are further pushed out of the reaction channel by incoming fuel and oxidizer, resulting in a propelling force capable of driving an aircraft or rocket at supersonic or hypersonic speed.

Fuels and oxidizers currently used for RDREs are expensive, low density, must be stored separately from one another, and have limited storage lives.

Solid fuels and oxidizers are not suitable for use in RDREs because the fuel and oxidizer must be fluids so that they can be introduced to the combustion chamber as needed. Solid fuel rocket engines generally cannot be stopped and restarted. Liquid fuels and oxidizers are desirable because they can be pumped into the combustion chamber in a controlled manner. Liquids at ambient temperature and pressure are preferable because they can be stored in lightweight containers without continuous pressurization or refrigeration. Fuels such as liquid hydrogen and liquid methane require cryogenic storage, as does the oxidizer, liquid oxygen.

Also, many cryogenic liquid rocket fuels such as liquid hydrogen or liquid methane must be stored at low temperature. Similarly, liquid oxygen requires continuous refrigeration. Solid oxidizers and fuels, including ammonium perchlorate (AP), ammonium dinitramide (AND), ammonium nitrate (AN), and hydrazinium nitroformate (HNF), are incompatible with rocket engines that can be stopped and restarted. Liquid oxygen is inherently incompatible with wooden rounds, or storage and use without additional fueling or ongoing servicing. Several of the commonly used oxidizers mentioned above are polluting. Hydrogen peroxide has an advantage in being an inherently "green" chemical. Catalytic decomposition of hydrogen peroxide releases 2.877 MJ of energy per 1 kg of hydrogen peroxide and produces green products according to the following reaction:

$H_2O_2 \rightarrow H_2O + \frac{1}{2}O_2$

This reaction leads to generation of superheated water steam and oxygen. Mass-wise, 47% of the decomposition reaction products of $H_2O_2$ is molecular oxygen, which makes its high oxygen concentration efficient for use as an oxidizer for various rocket fuels.

However, $H_2O_2$ must be decomposed before it can be used as an oxidizer. Liquid $H_2O_2$ has a high surface tension (80 mN/m) and high heat of vaporization (48.5 kj/mol). Hence considerable energy is required to prepare liquid $H_2O_2$ for combustion. When $H_2O_2$ at high concentrations is catalytically decomposed, the chemical energy of decomposition is sufficient to fully vaporize the $H_2O_2$ (and diluent water). Heretofore, $H_2O_2$ has been decomposed on a catalyst bed sized to support decomposition of the $H_2O_2$ during flight. However, a catalyst bed sized to support decomposition of the $H_2O_2$ during flights adds significant mass and volume to a rocket. Typically, hydrogen peroxide is commercially available as a solution in water. For the purposes of this discussion, hydrogen peroxide is meant to include both pure hydrogen peroxide and hydrogen peroxide-water solutions.

In accordance with the present disclosure, we employ high-pressure jets of $H_2O_2$ impinging on a surface and/or impinging on jets of liquid fuel to provide sufficient kinetic energy to atomize the liquid $H_2O_2$ by conversion of the kinetic energy into increased surface area, surface energy, and smaller droplets.

More particularly, we provide a rocket configured to run on a fuel that is liquid at ambient temperature and on liquid $H_2O_2$ oxidizer, which overcomes the aforesaid problems of the prior art. In accordance with the present disclosure, we provide a rocket engine configured to operate on liquid fuel and liquid $H_2O_2$ without the need for a catalyst bed to support decomposition of the $H_2O_2$ during continuous operation of the rocket engine following initial ignition. In one aspect of the disclosure, we provide an RDRE configured to operate on liquid fuel and liquid $H_2O_2$ that is capable of ignition and continuous operation in which the liquid $H_2O_2$ and liquid fuel are delivered directly to the rocket reaction chamber.

In another embodiment of the present disclosure, we provide an RDRE configured to operate on liquid fuel and liquid $H_2O_2$ having a combustion chamber injector design configured to deliver finely atomized liquid fuel and liquid $H_2O_2$ into the combustion chamber to spontaneously ignite the liquid fuel and to create a circulating detonation wave. Once combustion is initiated, the liquid $H_2O_2$ and liquid fuel delivered directly to the reaction chamber continue to detonate and expand out of the combustion chamber in a continuous wave.

In yet another aspect of the disclosure, we feed an easily-ignited fuel such as a low molecular weight hydrocarbon, such as propane, or ethers, such as diethyl ether, and liquid $H_2O_2$, or a hypergolic fuel and liquid $H_2O_2$ to a rocket engine to achieve initial ignition. Once initial ignition is achieved, the fuel feed is switched to a conventional liquid rocket fuel to deliver the conventional liquid rocket fuel and the liquid $H_2O_2$ directly to the combustion chamber.

In one embodiment, the liquid fuel comprises a conventional liquid hydrocarbon fuel such as kerosene, including grades such as RP-1 (Rocket Propellant 1) or JP-8 (Jet Propellant 8).

In yet another embodiment, the initiator comprises a hypergolic fuel, such as a borane-based fuel (such as ammonium borane, diborane, pentaborane, or triethylborane), a member of the borohydride family (e.g., sodium borohydride, lithium borohydride, potassium borohydride), or an easily-ignited fuel such as diethylether, or tetrahydrofuran (THF). These borohydrides are often solids and may be used while dissolved in another liquid.

In another aspect we provide a method for initiating startup of a rocket engine configured to run on a liquid fuel and liquid $H_2O_2$, comprising the steps of impinging high pressure streams of liquid fuel and liquid $H_2O_2$ into a combustion chamber under pressure and temperature conditions sufficient to achieve atomization and autoignition, and once detonation is initiated, continuing to feed the liquid $H_2O_2$ and liquid fuel directly to the combustion chamber of a rocket.

The present disclosure also provides a rocket engine configured to introduce atomized liquid fuel and atomized liquid $H_2O_2$ under conditions that promote autoignition and continuous detonation.

In one aspect the rocket engine atomizer jets are located on an outer perimeter of the combustion chamber. In such arrangement, momentum of the injected atomized droplets carries the droplets toward the inner walls, partially compensating for the outward influence of swirl.

In another embodiment, the jets impinge at an angle to one another at a high relative velocity to cause atomization.

In yet another embodiment, the combustion chamber has a tapered annular combustion chamber.

In still yet another embodiment, the rocket engine has one or more ignition torches angled tangentially into the combustion chamber. The torch may comprise a chemical flame, detonation source, electric arc, plasma, or other energetic ignition source.

More particularly in accordance with one aspect of the disclosure there is provided a method of initiating startup of a rocket engine configured to run on a liquid fuel and liquid hydrogen peroxide ($H_2O_2$) comprising the steps of: (a) impinging high pressure atomized streams of a low molecular weight liquid fuel and liquid $H_2O_2$ into a combustion chamber of the rocket engine under pressure and temperature conditions sufficient to decompose the liquid $H_2O_2$ into hot water stream and oxygen, and achieve ignition of the low molecular weight fuel; and (b) once ignition is initiated, introducing a heavier molecular weight liquid fuel directly into a combustion chamber, and discontinuing flow of the low molecular weight fuel.

In one aspect the low molecular weight fuel comprises a $C_2$-$C_6$ hydrocarbon.

In another aspect we add a hypergolic fuel to the low molecular weight fuel. In such aspect, the hypergolic fuel preferably is added as a detached mass or slug.

In a further aspect the liquid $H_2O_2$ stream is introduced into the combustion chamber before introduction of the stream of liquid fuel.

In another aspect the heavier molecular weight fuel comprises kerosene or jet propellant.

In yet another aspect we provide a method for initiating startup of a rocket engine configured to run on a liquid fuel and liquid $H_2O_2$, comprising the steps of impinging a high pressure stream of liquid $H_2O_2$ and a high pressurized atomized stream of liquid fuel on one another in a combustion chamber of the rocket engine; activating a torch to achieve initial ignition of the fuel/$H_2O_2$ mixture; deactivating the torch, and continuing feed of high pressure stream of liquid fuel and liquid $H_2O_2$ into the combustion chamber of the rocket.

In one aspect the rocket fuel comprises kerosene or jet propellant.

In yet another aspect there is provided a rocket system comprising a rocket engine configured to run on liquid fuel and liquid $H_2O_2$, said rocket engine comprising combustion chamber including a mixing section, wherein the detonation sector includes an annulus extending to a nozzle section of the rocket.

In one aspect the annulus is tapered.

In one aspect the tapered annulus has an inlet to outlet ratio of between 3:1 and 1:1.

In a further aspect the rocket system comprises one or more ignition torches.

In one aspect the ignition torches are aimed tangentially into the combustion chamber.

In another aspect the ignition torches form the combustion chamber at a position equal to about 4 times the width of the combustion chamber annulus downstream of the injection plate.

In a further aspect the ignition torches are directly coupled to the detonation sector.

The disclosure also provides a method of initiating startup of a rocket engine configured to run on a liquid fuel and liquid hydrogen ($H_2O_2$) comprising the steps of: (a) impinging high pressure streams of a low molecular weight liquid fuel and decomposed $H_2O_2$ into a combustion chamber of the rocket engine under pressure and temperature conditions sufficient to achieve ignition of the liquid fuel; and (b) once ignition is initiated, introducing liquid $H_2O_2$ in such a way as to cause atomization into the combustion chamber, and discontinuing flow of the decomposed $H_2O_2$.

In one aspect of the method the decomposed $H_2O_2$ is introduced into the combustion chamber before introduction of the fuel.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Further features and advantages of the present disclosure will be seen from the following description, taken in connection with the accompanying drawings, wherein.

DETAILED DESCRIPTION OF THE DISCLOSURE

Example embodiments will now be described more fully with reference to the accompanying drawings. Example embodiments are provided so that this disclosure will be thorough and will fully convey the scope to those who are skilled in the art. Numerous specific details are set forth such as examples of specific components, devices, and methods to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, components and/or groups, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another elements, component, region, layer, or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein "conventional liquid rocket fuel" shall mean any fuel that is liquid at ambient temperature and pressure, such as JP-8 or RP-1 grades of kerosene which are given as exemplary. Other common and useful rocket fuels that are not liquid at ambient temperature and pressure include liquid hydrogen, liquid methane, propane, and butane. Low molecular weight fuel shall mean any $C_2$-$C_6$ hydrocarbon or low molecular weight alcohol or ester. And hypergolic fuel shall mean any liquid fuel that can spontaneously ignite without any auxiliary ignition source once in physical contact with an oxidizer, including but not limited to hydrazine, monomethylhydrazine and unsymmetrical dimethylhydrazine, which are given as exemplary.

Also as used herein "combustion chamber" or "reaction section' and "detonation chamber" or "detonation section" are used interchangeably to refer to the section of a rocket engine in which mixed fuel and oxidizer undergo deflagration or detonation.

Figure 1:
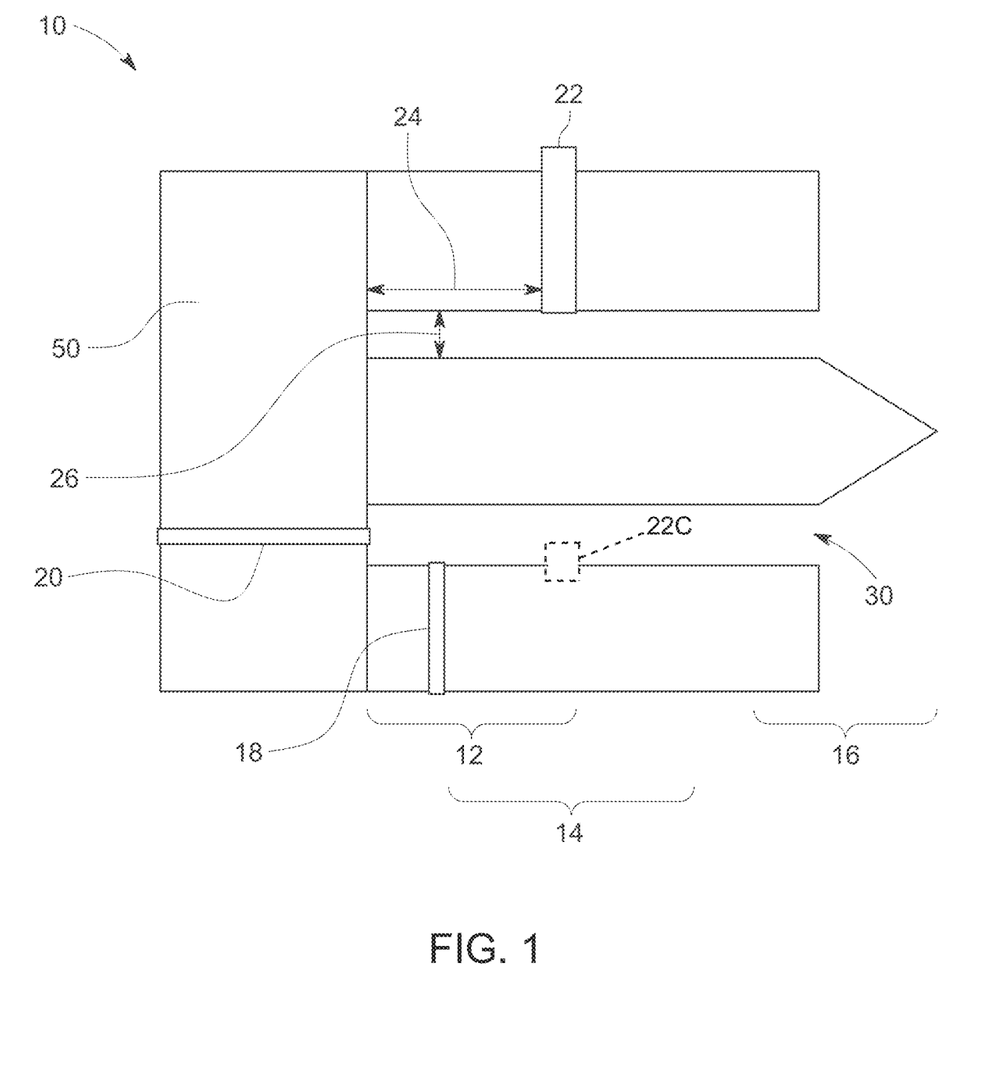
FIG. 1 is a cross-sectional view of the mixing, detonation and nozzle portion of a Rotation Detonation Rocket Engine (RDRE) in accordance with the present disclosure.

Referring to FIG. 1, there is illustrated the mixing, detonation and nozzle (injector) sections of a RDRE 10 in accordance with one embodiment of our disclosure. RDRE 10 includes a mixing section 12 where fuel and oxidizer are mixed, a combustion chamber 14 where the fuel and oxidizer undergo combustion or deflagration, and a nozzle section 16 where the products of combustion expand out of the engine. Fuel is introduced from a fuel tank (not shown) via fuel nozzle 18 into mixing section 12, while oxidizer is supplied to mixing section 12 from an oxidizer tank (now shown) via oxidizer nozzle 20. By way of example, the oxidizer comprises liquid $H_2O_2$, while the fuel comprises liquid JP-8. Liquid fuel and liquid oxidizer are injected under high pressure through nozzles to form streams of fuel and oxidizer which impinge on one another at high relative velocities to cause atomization. The high pressure streams impinging on one another convert kinetic energy of the liquid droplets into increased surface area of the droplets. Upon chemical reaction within the oxidizer or between the oxidizer and fuel, there is heat sufficient to cause thermal decomposition of the $H_2O_2$ into hot water steam and oxygen, which reacts with the liquid fuel droplets in combustion chamber 14. The products of combustion expand out of the combustion chamber 14 via combustion chamber annulus 30 into nozzle section 16, propelling the rocket forward. The reaction continues as long as fuel and $H_2O_2$ are supplied to the combustion chamber 14. RDRE 10 also includes pumps, conduits, valves, controls, etc. (not shown) which are conventional and well known to those skilled in the art of rocket engines.

Figure 2:
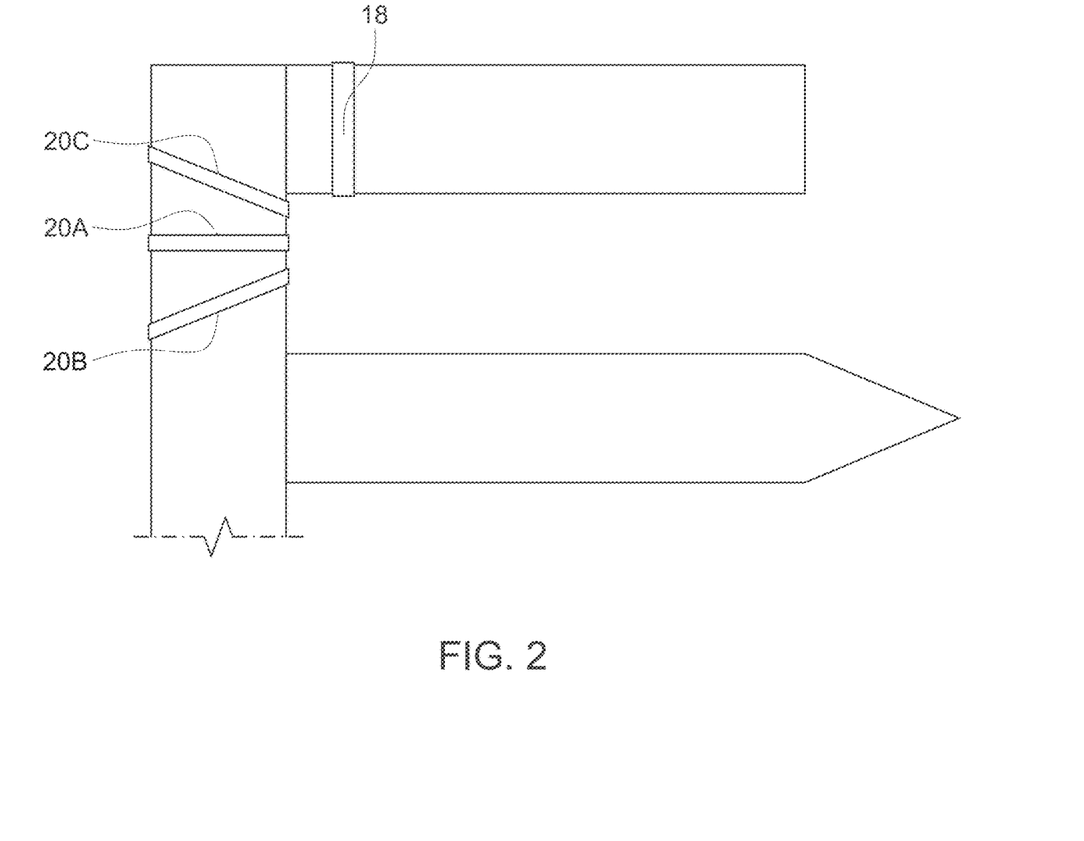
FIG. 2 is a cross-sectional view of one side of an alternative embodiment of mixing portion of an RDRE in accordance with the present disclosure.

In one embodiment, one or more ignition torch(es) 22 may be provided, directed into the combustion chamber 14 as will be discussed below. In another embodiment, the torch 22 may be located a distance 24 from the injector plate 50 about four times the width 26 of the combustion chamber annulus. In some embodiments, the ignition torch(es) 22 comprise one or more augmented torches comprising spark-initiated hydrogen and oxygen. In some embodiments, the oxidizer is hydrogen peroxide (e.g., 90% $H_2O_2$) and the fuel is a hydrocarbon (e.g., propane, JetA/kerosene). Successful tests were performed at sea level with oxidizer comprising 90% $H_2O_2$ and fuel comprising propane, where propane injection pressure was sufficient that the propane would be liquid at injector 18. Successful tests were also performed at sea level with oxidizer of 90% $H_2O_2$ and fuel of JetA. In some embodiments, fuel is introduced via fuel nozzle 18 before oxidizer is introduced via oxidizer nozzle 20. In some embodiments, the ignition of the torch(es) 22 is timed such that the energy released from the torch is imparted into the least amount of propellant to successfully ignite it before full flow of propellant is realized. Referring to FIG. 2, in another embodiment, the oxidizer injection nozzles comprise a plurality of injection nozzles 20A, 20B, 20C, that are configured at angles to one another, which has the effect of maximizing the kinetic energy being imparted into the fuel and oxidizer atomization. By the same token the fuel injection nozzle 18 may be configured to direct fuel to impinge at an angle relative to the oxidizer nozzles 20A, 20B. The nozzles are all located on an outer perimeter of the combustion chamber. In such arrangement, momentum of the injected atomized droplets carries the droplets towards the inner walls.

Figure 3:
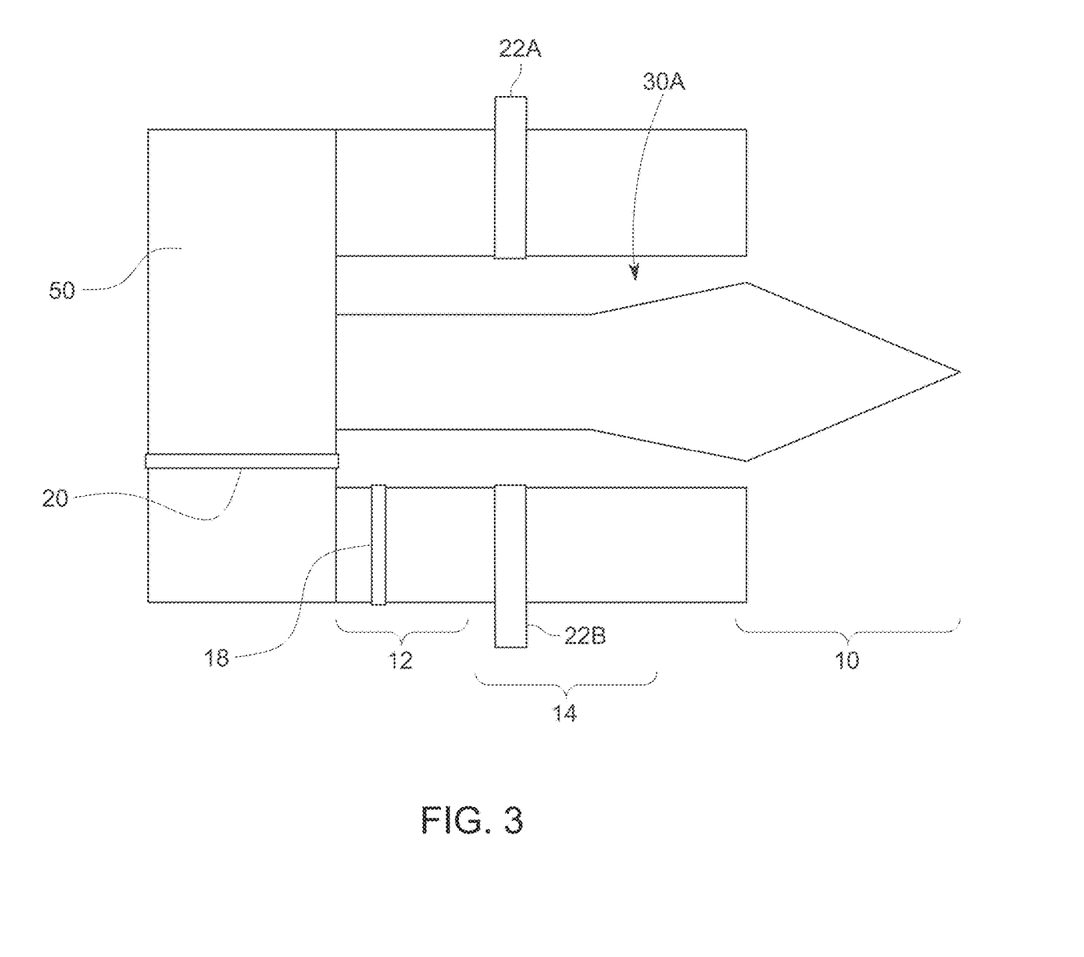
FIG. 3 is a view similar to FIG. 1 of an alternative embodiment of RDRE in accordance with the present disclosure.

Referring to FIG. 3, in a preferred embodiment, the combustion chamber annulus 30 is tapered, i.e., at 30A. Tapering the combustion chamber annulus permits better control of flame velocity, detonation velocity and reactive mass flow rate. The taper also makes the rocket engine easier to start, i.e., achieve initial deflagration. By way of example, the taper may decrease from the cross-sectional area of the combustion chamber to half of that area at the exhaust nozzle.

In a preferred embodiment the rocket engine includes two torches 22A, 22B downstream of the mixing section 12, configured to introduce flame into annulus 30A for achieving initial ignition of the RDRE. Torches 22A, 22B may be any type of torch conventionally used with rocket engines, such as flame torches, detonation torches, or plasma arc torches, and preferably are offset to direct their exhaust into the combustion chamber tangentially to maximize their interaction with the fuel and oxidizer while reducing their impact on combustion chamber walls.

Placement of the torches 22A, 22B in the combustion chamber 14 has an effect on detonation and transition to propagation. By placing the torches at a position equal to about 4 times the width of the combustion chamber annulus downstream of the combustion chamber injector plate 50, we achieve smooth detonation and transition to propagation around the combustion chamber 14. If the torches 22A, 22B are placed too close to the combustion chamber injector plate 50, the torch(es) could interfere with the smooth detonation and propagation around the combustion chamber 14. On the other hand, if the torches 22A, 22B are placed too far away from the combustion chamber injection plate 50, the torch(es) may not be able to drive ignition and transition to detonation.

Also, using torches angled tangentially into the combustion chamber as shown in phantom at 22C, the hot flames from the torches do not impact the inner wall of the chamber. Tangential injection of the torch flames maximizes the distance from the torch throat to the flame impingement on the chamber walls. As a result, ignition is improved, and erosion of the combustion chamber inner wall is reduced.

In operation, to achieve ignition, typically oxidizer is first delivered into the mixing section 12. The torches 22A, 22B are then ignited, and fuel is then introduced into the mixing section 12. Once deflagration is achieved, the torches 22A, 22B are deactivated, and combustion then continues as long as oxidizer and fuel are delivered to the engine. To prevent hot combustion gasses from damaging the torch, a purge gas may continue to flow through the torch.

Figure 4:
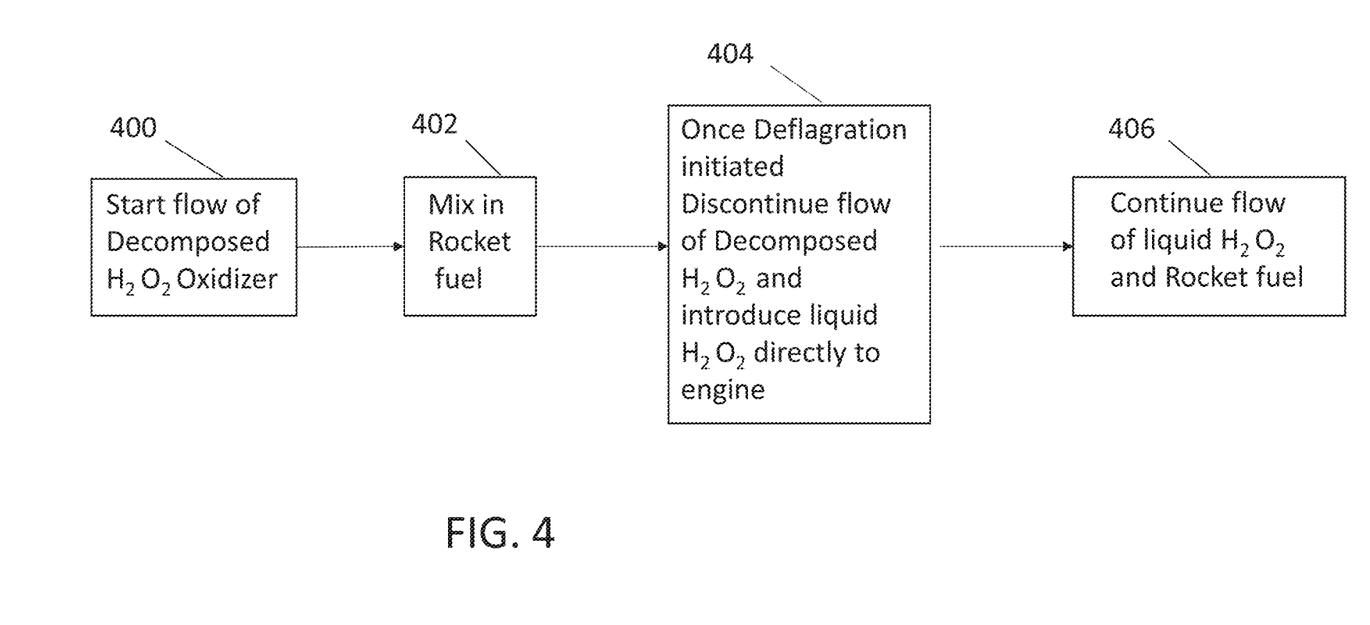
FIGS. 4-6 are flow diagrams depicting ignition and operation of an RDRE in accordance with the present disclosure.
Figure 5:
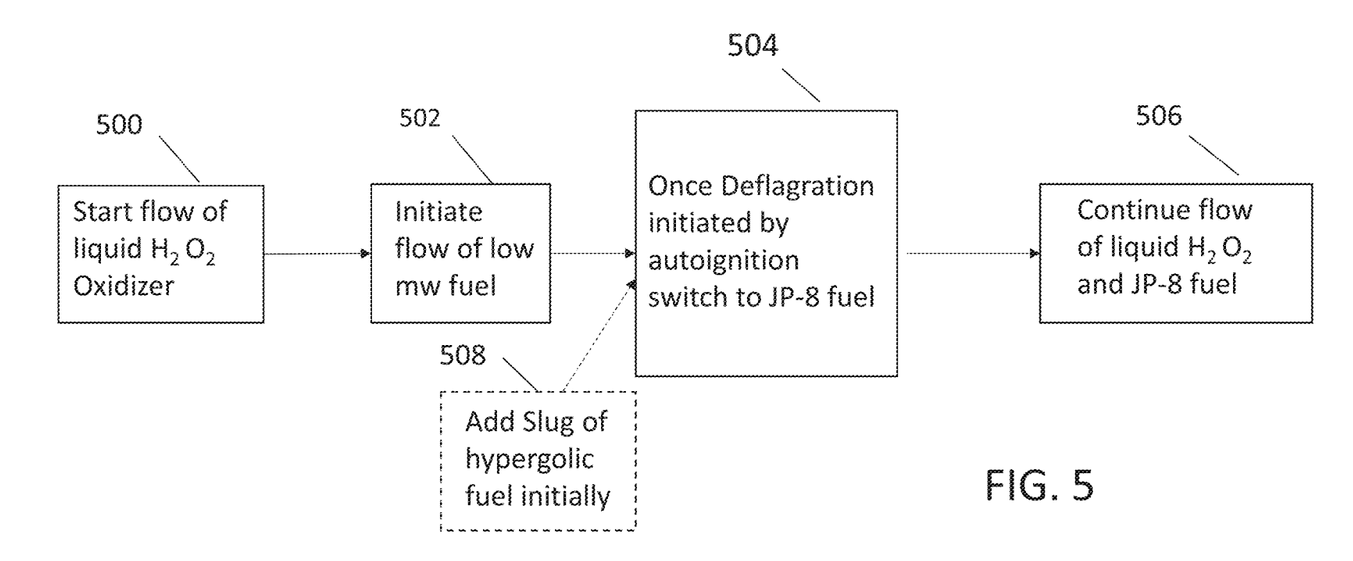
Figure 6:
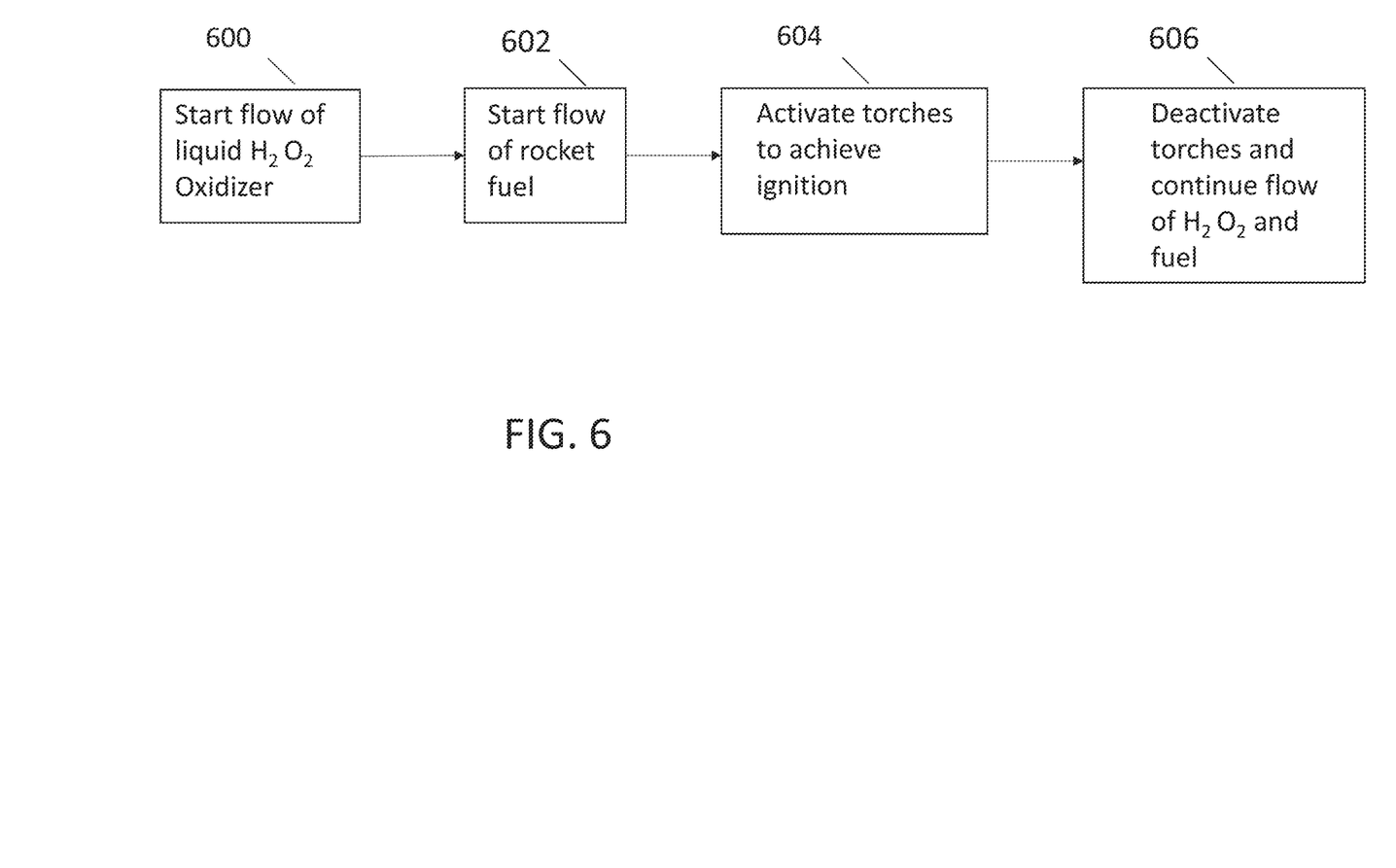

FIGS. 4, 5 and 6 illustrate three schemes for ignition and operation of an RDRE in accordance with the present disclosure. Referring to FIG. 4, we initiate ignition of RDRE by first starting the flow of decomposed $H_2O_2$ oxidizer 400 followed by introduction of JP-8 fuel 402. The fine atomization creates greater surface areas of the fuel and oxidizer droplets and provides better mixing of the fuel and oxidizer. Once deflagration is initiated 404, we switch oxidizer feed to liquid $H_2O_2$ 406, which is decomposed into hot water steam and oxygen by the high temperature conditions in the engine.

Alternatively, as shown in FIG. 5, we start the flow of liquid $H_2O_2$ oxidizer 500 directly into the mixing section of the RDRE, and then introduce a low molecular weight fuel 502 such as propane. Once ignited, combustion can transition to detonation. Once detonation is initiated, the propane feed is switched off while the feed of JP-8 fuel 504 is started. The rocket engine continues operating as long as the flow of $H_2O_2$ and JP-8 continues 506. Another optional process includes a slug of a hypergolic fuel 508 when turning on the propane feed initially. Alternatively, as shown in FIG. 6, the process is initiated by injecting hot $H_2O_2$ 600 directly into the RDRE and then introducing JP-8 fuel 602. After introducing the JP-8 fully, we activate torches to ignite the $H_2O_2$/fuel mixture 604. Once ignition is achieved, we turn the torches off 606.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Various changes and advantages may be made in the above disclosure without departing from the spirit and scope thereof.

What is claimed:

1. A rocket system comprising a rocket engine configured to run on liquid fuel and liquid $H_2O_2$, said rocket engine comprising: a detonation chamber including a mixing section wherein liquid fuel and liquid $H_2O_2$ originating from an injection plate are impinged on one another; and a detonation section wherein the liquid fuel and liquid $H_2O_2$ achieve ignition and detonation, wherein the detonation section includes an annulus extending to a nozzle section of the rocket, and wherein the rocket system comprises one or more ignition torches which join the detonation chamber at a position equal to about 4 times a width of the annulus downstream of the injection plate.

2. The rocket system of claim 1, wherein the annulus is tapered.

3. The rocket system of claim 2, wherein the tapered annulus has an inlet to outlet ratio of between 3:1 and 1:1.

4. The rocket system of claim 1, wherein the one or more ignition torches are aimed tangentially into the detonation chamber.

5. The rocket system of claim 1, wherein the one or more ignition torches are directly coupled to the detonation section.

6. A method for initiating startup of the rocket system as claimed in claim 1 configured to run on the liquid fuel and the liquid $H_2O_2$, comprising the steps of: impinging a high pressure stream of the liquid $H_2O_2$ and a high pressurized stream of the liquid fuel on one another in the detonation chamber of the rocket engine; activating said one or more ignition torches to achieve initial ignition of the fuel/$H_2O_2$ mixture; deactivating the one or more ignition torches; and continuing feed of the high pressure streams of the liquid fuel and the liquid $H_2O_2$ into the detonation chamber of the rocket system.

7. The method of claim 6, wherein the liquid fuel comprises kerosene, jet, or rocket propellant.

* * * * *